United States Patent
Bloxham

(10) Patent No.: US 12,435,634 B2
(45) Date of Patent: Oct. 7, 2025

(54) NOTCHED TURBINE AIRFOILS FOR WEIGHT REDUCTION IN GAS TURBINE ENGINES

(71) Applicant: Rolls-Royce North American Technologies Inc., Indianapolis, IN (US)

(72) Inventor: Matthew J. Bloxham, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 0 days.

(21) Appl. No.: 18/516,320

(22) Filed: Nov. 21, 2023

(65) Prior Publication Data

US 2025/0163810 A1    May 22, 2025

(51) Int. Cl.
*F01D 5/14* (2006.01)

(52) U.S. Cl.
CPC ............. *F01D 5/146* (2013.01); *F01D 5/147* (2013.01); *F05D 2220/32* (2013.01); *F05D 2240/305* (2013.01)

(58) Field of Classification Search
CPC ...... F01D 5/146; F01D 5/147; F05D 2220/32; F05D 2240/305
See application file for complete search history.

(56) References Cited

U.S. PATENT DOCUMENTS

| | | | |
|---|---|---|---|
| 3,304,056 A | | 2/1967 | Sohma |
| 5,337,568 A | * | 8/1994 | Lee ............................ F01D 5/18 60/755 |
| 6,092,766 A | * | 7/2000 | LaRoche .................... F15D 1/12 244/200 |
| 6,976,826 B2 | | 12/2005 | Roy et al. |
| 9,670,900 B2 | | 6/2017 | Carroll et al. |
| 10,569,365 B2 | * | 2/2020 | Song ..................... B23K 26/364 |
| 11,220,913 B2 | | 1/2022 | Molnar, Jr. |
| 11,326,478 B2 | * | 5/2022 | Cho ......................... F01D 25/30 |
| 2009/0185911 A1 | | 7/2009 | Roberge |
| 2011/0262705 A1 | * | 10/2011 | Gupta ...................... B64C 21/10 428/156 |
| 2014/0301860 A1 | * | 10/2014 | Ramm .................... F04D 29/681 416/223 R |
| 2016/0108740 A1 | | 4/2016 | Srinivasan et al. |
| 2017/0159442 A1 | * | 6/2017 | Velazquez, Jr ......... F01D 5/288 |
| 2017/0167510 A1 | * | 6/2017 | Berschback .............. F01D 9/04 |
| 2017/0211391 A1 | | 7/2017 | Wygant |
| 2017/0234134 A1 | * | 8/2017 | Bunker .................. F04D 29/542 415/208.2 |
| 2018/0023397 A1 | * | 1/2018 | Vandeputte .............. F01D 5/147 416/228 |
| 2020/0263553 A1 | | 8/2020 | Sweidan et al. |
| 2021/0310361 A1 | | 10/2021 | Zhang et al. |

* cited by examiner

*Primary Examiner* — Nathaniel E Wiehe
*Assistant Examiner* — Theodore C Ribadeneyra
(74) *Attorney, Agent, or Firm* — Barnes & Thornburg

(57) ABSTRACT

An airfoil adapted for use in a gas turbine engine includes a base and an airfoil body that extends radially outward from the base relative to an axis to a tip of the airfoil body. The airfoil body has a leading edge, a trailing edge, a suction side, and a pressure side. The airfoil body is formed to include notches that extend into the airfoil body to reduce a weight of the airfoil.

16 Claims, 4 Drawing Sheets

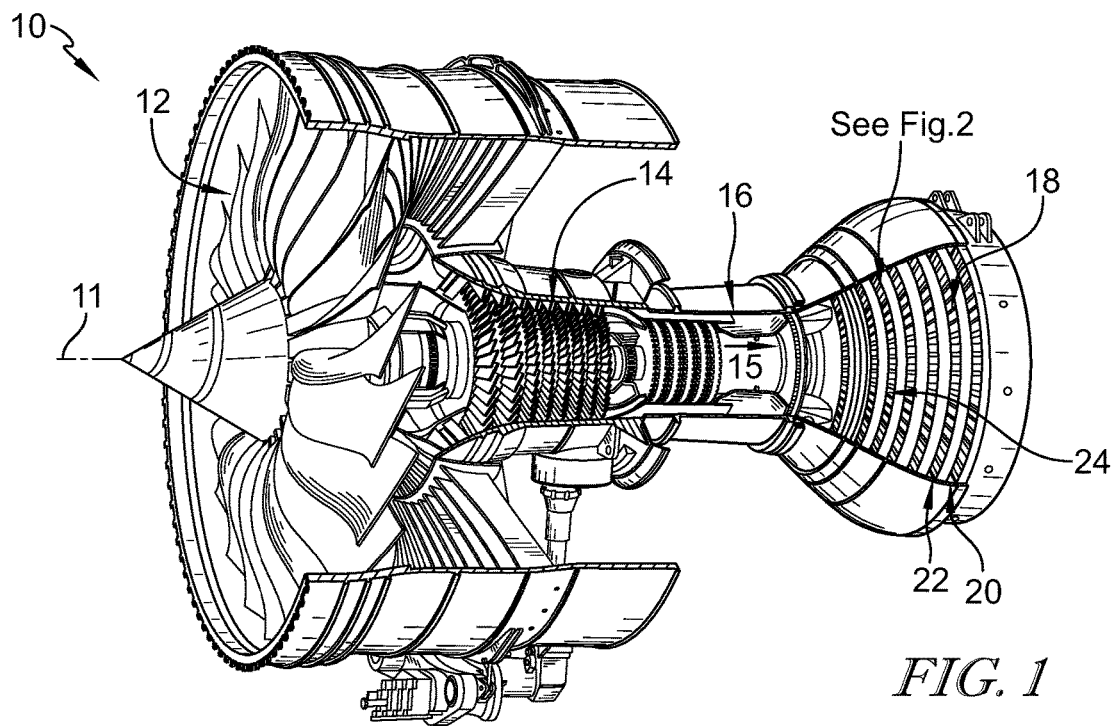
FIG. 1
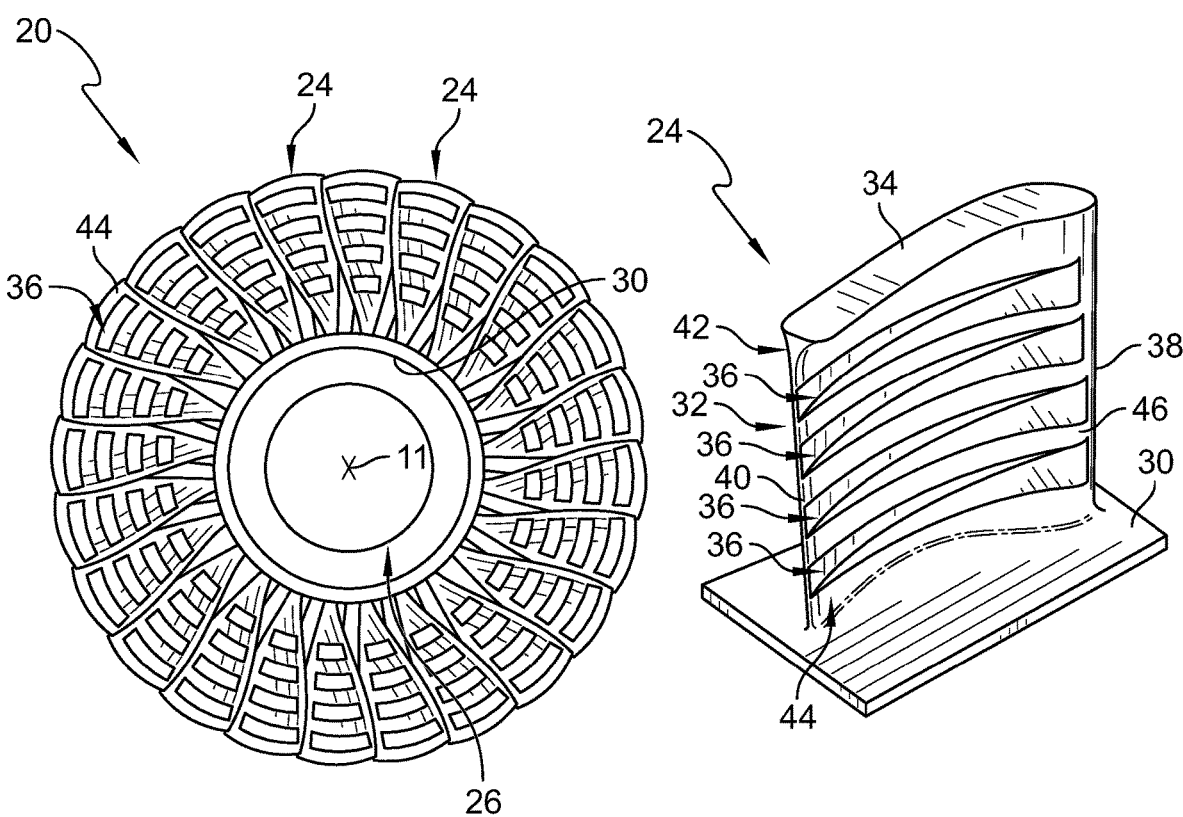
FIG. 2
FIG. 3

NOTCHED TURBINE AIRFOILS FOR WEIGHT REDUCTION IN GAS TURBINE ENGINES

FIELD OF THE DISCLOSURE

The present disclosure relates generally to gas turbine engines, and more specifically to turbine airfoils of gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines also typically include airfoils arranged within the engine components, such as a turbine wheel assembly in the turbine. Airfoils are typically designed to prevent any two-dimensional separation of a three-dimensional flow field formed on the airfoil during operation of the gas turbine engine. Current airfoils have been designed to have a large closed pressure surface separation, which exacerbate end-wall flow fields. Additionally, reducing weight in the gas turbine engine is desired.

SUMMARY

The present disclosure may comprise one or more of the following features and combinations thereof.

A turbine wheel assembly according to an aspect of the present disclosure includes a rotor hub and an airfoil. The rotor hub is configured to rotate about an axis. The airfoil is coupled with the rotor hub and configured to rotate the rotor hub about the axis in response to gases acting on the airfoil during use of the turbine wheel assembly. The airfoil includes a base and an airfoil body. The base is coupled with the rotor hub. The airfoil body extends radially outward from the base to a tip of the airfoil body. The airfoil body has a leading edge, a trailing edge spaced apart axially from the leading edge, a suction side that extends between the leading edge and the trailing edge, and a pressure side that extends between the leading edge and the trailing edge opposite the suction side.

The pressure side of the airfoil is formed to define a plurality of notches that extend into an external surface of the airfoil toward the suction side. Each of the plurality of notches is spaced apart radially from a neighboring one of the plurality of notches between the base and the tip so that a weight of the airfoil is minimized while isolating radial outward separation of pressure surface boundary layer separation within each of the plurality of notches to allow airflow along the airfoil.

In some embodiments, each of the plurality of notches includes an inner surface and an outer surface spaced radially apart from the inner surface towards the tip of the airfoil. The inner surface and the outer surface are planar. The radial distance between the inner surface and the outer surface of each of the plurality of notches defines a height for each of the plurality of notches.

In some embodiments, the plurality of notches includes a first notch having a first height and a second notch spaced radially apart from the first notch and having a second height equal to the first height. A radial distance between the outer surface of the first notch and the inner surface of the second notch is less than the first height.

In some embodiments, the plurality of notches includes a first notch having a first height and a second notch spaced radially apart from the first notch and having a second height equal to the first height. A radial distance between the outer surface of the first notch and the inner surface of the second notch is equal to the first height.

In some embodiments, the plurality of notches includes a first notch having a first height and a second notch spaced radially apart from the first notch and having a second height less than the first height. In some embodiments, each of the plurality of notches extend chordwise between the leading edge and the trailing edge of the airfoil body. In some embodiments, each notch is airfoil shaped when viewed radially inward.

In some embodiments, the plurality of notches includes a first notch having an inner surface, an outer surface radially spaced apart from the inner surface, and a radially extending support that extends between and interconnects the inner surface and the outer surface to define a first portion of the first notch located near the leading edge and a second portion of the notch located near the trailing edge. The support provides a portion of the external surface of the pressure side.

According to another aspect of the disclosure, an airfoil adapted for use in a gas turbine engine includes a base and an airfoil body. The airfoil body extends radially outward from the base relative to an axis to a tip of the airfoil body. The airfoil body has a leading edge, a trailing edge spaced apart axially from the leading edge, and a first side that extends between the leading edge and the trailing edge.

The first side is formed to define a plurality of notches that extend into an external surface of the airfoil body. Each of the plurality of notches is spaced apart radially from a neighboring one of the plurality of notches between the base and the tip so that a weight of the airfoil is minimized while isolating radial separation of pressure surface boundary layer separation within each of the plurality of notches to allow airflow along the airfoil.

In some embodiments, each of the plurality of notches includes an inner surface and an outer surface spaced radially apart from the inner surface towards the tip of the airfoil. The radial distance between the inner surface and the outer surface defines a height for each of the plurality of notches.

In some embodiments, the inner surface and the outer surface are planar. In some embodiments, each of the plurality of notches extend chordwise between the leading edge and the trailing edge of the airfoil body.

In some embodiments, the plurality of notches includes a first notch having a first height and a second notch spaced radially apart from the first notch and having a second height equal to the first height. A radial distance between the outer surface of the first notch and the inner surface of the second notch is less than the first height.

In some embodiments, the plurality of notches includes a first notch having a first height and a second notch spaced radially apart from the first notch and having a second height equal to the first height. A radial distance between the outer surface of the first notch and the inner surface of the second notch is equal to the first height.

In some embodiments, the plurality of notches includes a first notch having a first height and a second notch spaced radially apart from the first notch and having a second height less than the first height. In some embodiments, each notch is airfoil shaped when viewed radially inward.

In some embodiments, the plurality of notches includes a first notch having an inner surface, an outer surface radially spaced apart from the inner surface, and a radially extending support that extends between and interconnects the inner surface and the outer surface to define a first portion of the first notch located near the leading edge and a second portion of the notch located near the trailing edge. The support provides a portion of the external surface of the first side.

These and other features of the present disclosure will become more apparent from the following description of the illustrative embodiments.

BRIEF DESCRIPTION OF THE DRAWINGS

FIG. 1 is a cut-away perspective view of a gas turbine engine showing that the exemplary engine includes a fan, a compressor, a combustor, and a turbine and suggesting that the turbine includes a turbine wheel assembly including a rotor hub rotatable about an axis of the gas turbine engine and a plurality of airfoils coupled to the rotor hub to rotate the rotor hub during use of the turbine wheel assembly;

FIG. 2 is an aft elevation view of the turbine wheel assembly of FIG. 1 showing that each of the plurality of airfoils includes a base coupled to the rotor hub and an airfoil body that extends radially outward from the base to a tip of the airfoil body;

FIG. 3 is a perspective view of an airfoil of the plurality of airfoils of FIG. 2 showing that the airfoil body includes a leading edge, a trailing edge spaced apart axially from the leading edge, a suction side that extends between the leading edge and the trailing edge, and a pressure side that extends between the leading edge and the trailing edge opposite the suction side and further showing that the pressure side is formed to define a plurality of notches that cooperate to minimize a weight of the airfoil while isolating radial migration of air flow caused by pressure surface boundary layer separation within each of the plurality of notches to allow airflow around the airfoil;

DETAILED DESCRIPTION OF THE DRAWINGS

Figure 4:
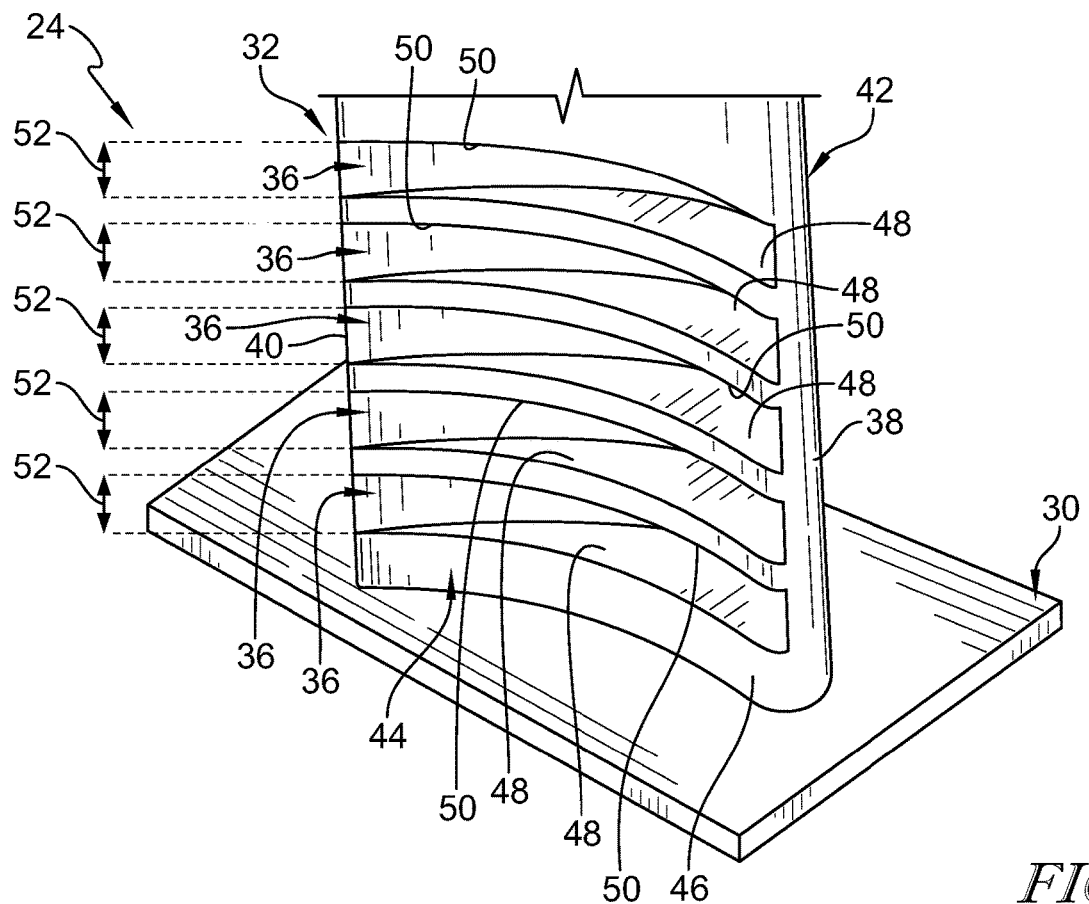
FIG. 4 is a perspective view of the airfoil of FIG. 3 showing that the airfoil body includes an external surface and that each of the plurality of notches are spaced apart radially from a neighboring one of the plurality of notches between the base and the tip of the airfoil body.

For the purposes of promoting an understanding of the principles of the present disclosure, reference will now be made to an illustrative embodiment shown in the drawings.

A turbine wheel assembly 20 adapted for use in a gas turbine engine 10 is shown in FIGS. 1-8. The turbine wheel assembly 20 includes a rotor hub 26 that is rotatable about an axis 11 and a plurality of airfoils 24 coupled with the rotor hub 26 to rotate the rotor hub 26 in response to pressurized gases acting on the airfoils 24 during use of the turbine wheel assembly 20.

Each of the plurality of airfoils 24 include a base 30 coupled with the rotor hub 26 and an airfoil body 32 that extends radially outward from the base 30 to a tip 34 of the airfoil body 32. The airfoil body 32 is formed to define a plurality of notches 36 that are spaced apart radially from neighboring ones of the plurality of notches 36 so that a weight of the airfoil 24 is minimized. Additionally, the plurality of notches 36 cooperate to prevent radial outward migration of the pressure surface boundary layer separation within each of the plurality of notches 36 to allow airflow 15 along each of the plurality of airfoils 24.

Turning again to the gas turbine engine 10, the gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration. In some embodiments, the combustor 16 may be replaced with a heat-exchanger or other heat source.

The turbine section 18 includes at least one turbine wheel assembly 20, shown in FIGS. 1 and 2, and at least one turbine vane assembly 22, shown in FIG. 1. The turbine wheel assembly 20 includes the plurality of airfoils 24 coupled to the rotor hub 26 to rotate the rotor hub 26 about the axis 11. The airfoils 24 may be integrally formed with the rotor hub 26 as a blisk or removably coupled with the rotor hub 26. The hot, high pressure combustion products from the combustor 16 are directed toward the airfoils 24 of the turbine wheel assemblies 20 along the gas path 15. The turbine vane assemblies 22 include turbine vanes configured to direct the gasses into downstream rotating turbine wheel assemblies 20. The turbine vanes may include a second plurality of airfoils 24 as described herein.

While the present disclosure describes features of airfoils 24 of the turbine wheel assembly 20, it should be appreciated that similar features described herein can be implemented in airfoils 24 of the turbine vanes or airfoils 24 of other vanes or blades present in the gas turbine engine 10. The airfoils 24 and turbine vanes are illustratively used in a low-pressure stage of the turbine 18. In other embodiments, the notches may be used in airfoils and vanes of high and/or intermediate turbine stages. In the illustrative embodiment, each of the airfoils 24 of the turbine wheel assembly 20 is formed to include the notches 36. In other embodiments, every other, or every nth airfoil 24 may include the notches 36.

An illustrative airfoil 24 of the plurality of airfoils 24 is shown in FIG. 3. As described above, the airfoil 24 includes the base 30 and the airfoil body 32 that extends radially outward from the base 30 to the tip 34 of the airfoil body 32. The airfoil body 32 includes a leading edge 38, a trailing edge 40 spaced apart axially from the leading edge 38, a suction side 42 that extends between the leading edge 38 and the trailing edge 40, and a pressure side 44 that extends between the leading edge 38 and the trailing edge 40 opposite the suction side 42.

Figure 5:
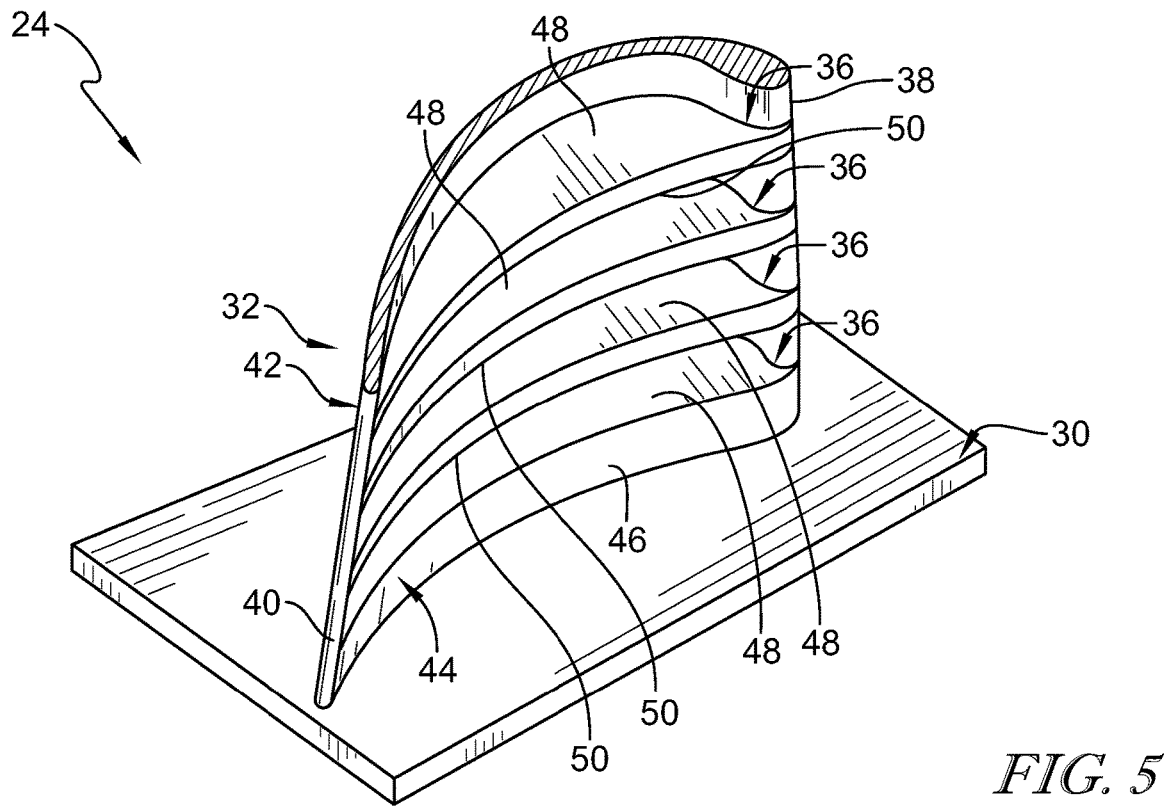
FIG. 5 is a cross-sectional and perspective view of the airfoil of FIG. 3 showing that the plurality of notches extend into the external surface toward the suction side of the airfoil body and that each notch of the plurality of notches is airfoil shaped when viewed radially inward.

The pressure side 44 includes an external surface 46 and is formed to define the plurality of notches 36 as shown in FIGS. 3-5. The plurality of notches 36 extend into the external surface 46 toward the suction side 42. Each of the plurality of notches 36 is spaced apart radially from a neighboring one of the plurality of notches 36 so that a weight of the airfoil 24 is minimized. Each of the plurality of notches 36 is configured to isolate radial separation of the pressure surface boundary layer separation within each of the plurality of notches to allow airflow 15 along the airfoil 24. As shown in FIG. 5, each of the plurality of notches 36 extends chordwise between the leading edge 38 and the trailing edge 40, and each notch 36 is airfoil shaped when viewed radially inward. In the illustrative embodiment, each of the plurality of notches 36 span the chordal width of the pressure side 44. In other embodiments, one or more of the notches 36 may span less than the chordal width of the pressure side 44.

As shown in FIGS. 4 and 5, each of the plurality of notches 36 includes an inner surface 48 and an outer surface 50 spaced radially apart from the inner surface 48 towards the tip 34 of the airfoil 24. In the illustrated embodiment, the inner surface 48 and the outer surface 50 are planar and cooperate to define a height 52 for each of the plurality of notches 36. The height 52 is the radial distance between the inner surface 48 and outer surface 50 of each respective notch 36 of the plurality of notches 36. In the embodiment of FIGS. 4 and 5, the height 52 of all notches 36 is about equal and the radial spacing between each notch 36 is less than the height 52.

Figure 6:
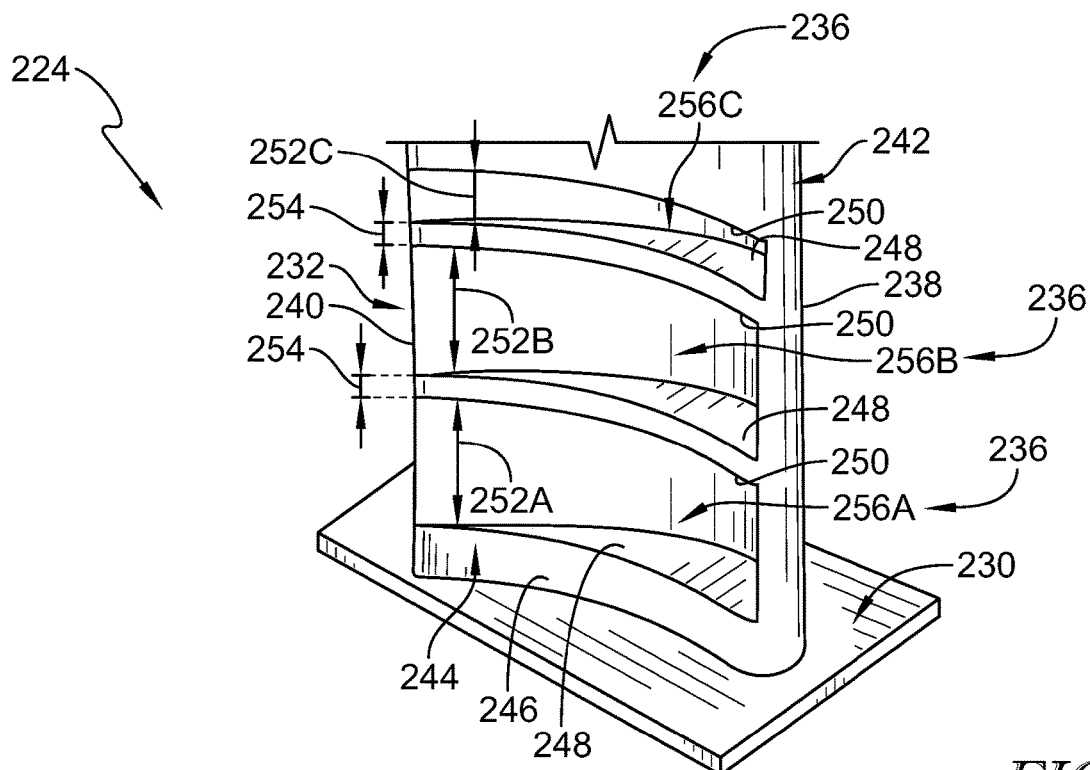
FIG. 6 is a perspective view of another embodiment of an airfoil of the plurality of airfoils of FIG. 2 showing that the plurality of notches includes a first notch that has a first height, a second notch that has a second height, and a radial distance between an outer surface of the first notch and an inner surface of the second notch that is less than the first and second heights.

Another embodiment of an airfoil 224 for use in a gas turbine engine 10 in accordance with the present disclosure is shown in FIG. 6. The airfoil 224 is substantially similar to the airfoil 24 shown in FIGS. 1-5 and described herein. Accordingly, similar reference numbers indicate features that are common between the airfoil 24 and the airfoil 224. The description of the airfoil 24 is incorporated by reference to apply to the airfoil 224, except in instances when it conflicts with the specific description and the drawings of the airfoil 224.

The airfoil 224 includes a base 230 and an airfoil body 232 that extends radially outward from the base 230 to the tip (not shown) of the airfoil body 232. The airfoil body 232 includes a leading edge 238, a trailing edge 240 spaced apart axially from the leading edge 238, a suction side 242 that extends between the leading edge 238 and the trailing edge 240, and a pressure side 244 that extends between the leading edge 238 and the trailing edge 240 opposite the suction side 242.

The pressure side 244 includes an external surface 246 and is formed to define the plurality of notches 236 as shown in FIG. 6. The plurality of notches 236 extend into the external surface 246 toward the suction side 242. Each of the plurality of notches 236 are spaced apart radially from a neighboring one of the plurality of notches 236 so that a weight of the airfoil 224 is minimized. Each of the plurality of notches 236 is configured to isolate radial separation of the pressure surface boundary layer separation within each of the plurality of notches to allow airflow along the airfoil 224. As shown in FIG. 6, each of the plurality of notches 236 extends chordwise between the leading edge 238 and the trailing edge 240. In the illustrative embodiment, each of the plurality of notches 236 span the chordal width of the pressure side 244. In other embodiments, one or more of the notches 236 may span less than the chordal width of the pressure side 244.

As shown in FIG. 6, each of the plurality of notches 236 includes an inner surface 248 and an outer surface 250 spaced radially apart from the inner surface 248 towards the tip of the airfoil 224. The inner surface 248 and the outer surface 250 are planar and cooperate to define a height 252A, 252B, 252C for each of the plurality of notches 236. The height 252A, 252B, 252C is the radial distance between the inner surface 248 and outer surface 250 of each respective notch 256A, 256B, 256C of the plurality of notches 236.

The plurality of notches 236 includes a first notch 256A having a first height 252A and a second notch 256B spaced radially apart from the first notch 256A. The second notch 256B has a second height 252B equal to the first height 252A. A radial distance 254 between the outer surface 250 of the first notch 256A and the inner surface 248 of the second notch 256B is less than both the first height 252A and the second height 252B.

In addition, the plurality of notches includes a third notch 256C spaced radially apart from the second notch 256B so that the second notch 256B is located radially between the first notch 256A and the third notch 256C. The third notch 256C has a third height 252C that is less than the first height 252A and the second height 252B. In the illustrative embodiment, a radial distance 254 between the outer surface 250 of the second notch 256B and the inner surface 248 of the third notch 256C is less than the first, second, and third heights 252A, 252B, 252C. In some embodiments, the second height 252B may be less than the first height 252A but greater than the third height 252C. Additionally or alternatively, the radial distance 254 may be greater than one or more of the first, second, and third heights 252A, 252B, 252C.

Figure 7:
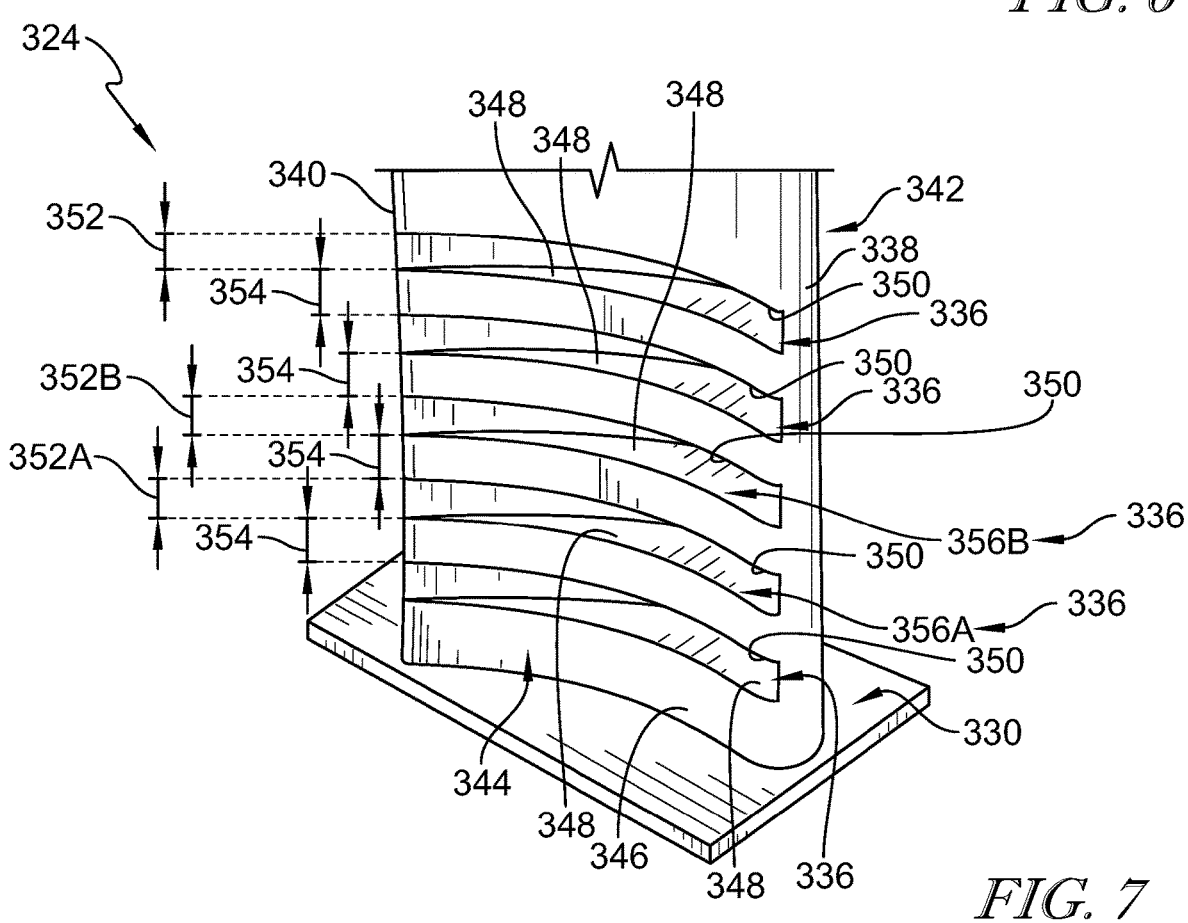
FIG. 7 is a perspective view of another embodiment of an airfoil of the plurality of airfoils of FIG. 2 showing that the plurality of notches includes a first notch that has a first height, a second notch that has a second height that is equal to the first height, and a radial distance between an outer surface of the first notch and an inner surface of the second notch that is equal to the first height.

Another embodiment of an airfoil 324 for use in a gas turbine engine 10 in accordance with the present disclosure is shown in FIG. 7. The airfoil 324 is substantially similar to the airfoils 24, 224 shown in FIGS. 1-6 and described herein. Accordingly, similar reference numbers indicate features that are common between the airfoil 324 and the airfoils 24, 224. The description of the airfoils 24, 224 is incorporated by reference to apply to the airfoil 324, except in instances when it conflicts with the specific description and the drawings of the airfoil 324.

The airfoil 324 includes a base 330 and an airfoil body 332 that extends radially outward from the base 330 to the tip (not shown) of the airfoil body 332. The airfoil body 332 includes a leading edge 338, a trailing edge 340 spaced apart axially from the leading edge 338, a suction side 342 that extends between the leading edge 338 and the trailing edge 340, and a pressure side 344 that extends between the leading edge 338 and the trailing edge 340 opposite the suction side 342.

The pressure side 344 includes an external surface 346 and is formed to define the plurality of notches 336 as shown in FIG. 7. The plurality of notches 336 extend into the external surface 346 toward the suction side 342. Each of the plurality of notches 336 are spaced apart radially from a neighboring one of the plurality of notches 336 so that a weight of the airfoil 324 is minimized. Each of the plurality of notches 336 is configured to isolate the pressure surface boundary layer separation within each of the plurality of notches to allow airflow along the airfoil 324 and prevent radial outward migration of the airflow. As shown in FIG. 7, each of the plurality of notches 336 extends chordwise between the leading edge 338 and the trailing edge 340. In the illustrative embodiment, each of the plurality of notches 336 span the chordal width of the pressure side 344. In other embodiments, one or more of the notches 336 may span less than the chordal width of the pressure side 344.

As shown in FIG. 7, each of the plurality of notches 336 includes an inner surface 348 and an outer surface 350 spaced radially apart from the inner surface 348 towards the tip of the airfoil 324. The inner surface 348 and the outer surface 350 are planar and cooperate to define a height 352 (352A, 352B) for each of the plurality of notches 336. The height 352 (352A, 352B) is the radial distance between the inner surface 348 and outer surface 350 of each respective notch 336 (356A, 356B) of the plurality of notches 336.

The plurality of notches 336 includes a first notch 356A having a first height 352A and a second notch 356B spaced radially apart from the first notch 356A. The second notch 356B has a second height 352B equal to the first height 352A. A radial distance 354 between the outer surface 350 of the first notch 356A and the inner surface 348 of the second notch 356B is equal to both the first height 352A and the second height 352B. In the illustrative embodiment, each notch 336 has the same height 352 that is equal to the radial distance 354 between the outer surface 350 and inner surface 348 of neighboring notches 336.

Figure 8:
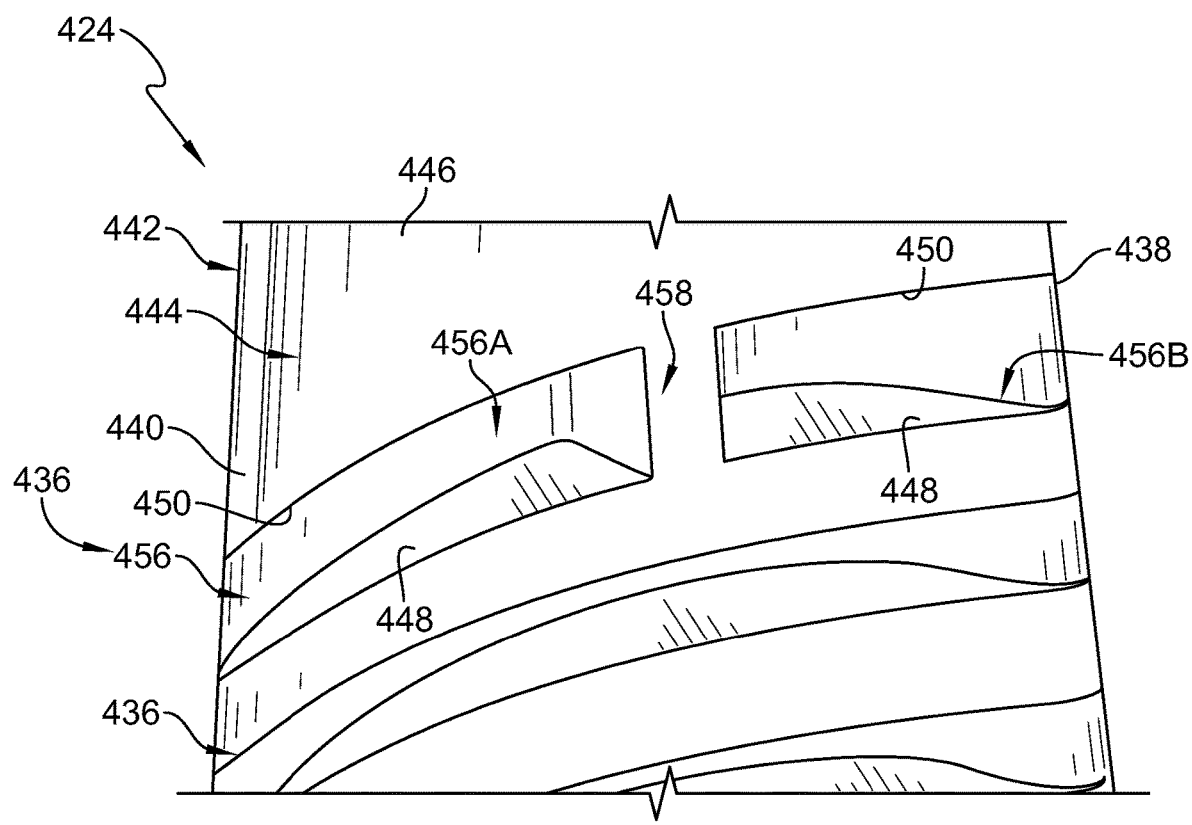
FIG. 8 is a detail view of another embodiment of an airfoil of the plurality of airfoils of FIG. 2 showing that the plurality of notches includes a first notch that includes a radially extending support that extends between and interconnects an inner surface and an outer surface of the first notch to define a first portion of the first notch located near the leading edge and a second portion of the first notch located near the trailing edge, and further showing that the support provides a portion of the external surface of the pressure side of the airfoil body.

Another embodiment of an airfoil 424 for use in a gas turbine engine 10 in accordance with the present disclosure is shown in FIG. 8. The airfoil 424 is substantially similar to the airfoils 24, 224, 324 shown in FIGS. 1-7 and described herein. Accordingly, similar reference numbers indicate features that are common between the airfoil 424 and the airfoils 24, 224, 324. The description of the airfoils 24, 224, 324 is incorporated by reference to apply to the airfoil 424, except in instances when it conflicts with the specific description and the drawings of the airfoil 424.

The airfoil 424 includes a base 430 and an airfoil body 432 that extends radially outward from the base 430 to the tip (not shown) of the airfoil body 432. The airfoil body 432 includes a leading edge 438, a trailing edge 440 spaced apart axially from the leading edge 438, a suction side 442 that extends between the leading edge 438 and the trailing edge 440, and a pressure side 444 that extends between the leading edge 438 and the trailing edge 440 opposite the suction side 442.

The pressure side 444 includes an external surface 446 and is formed to define the plurality of notches 436 as shown in FIG. 8. The plurality of notches 436 extend into the external surface 446 toward the suction side 442. Each of the plurality of notches 436 are spaced apart radially from a neighboring one of the plurality of notches 436 so that a weight of the airfoil 424 is minimized. Each of the plurality of notches 436 is configured to isolate radial outward migration of the pressure surface boundary layer separation within each of the plurality of notches to allow airflow along the airfoil 424. As shown in FIG. 8, each of the plurality of notches 436 extends chordwise between the leading edge 438 and the trailing edge 440. In the illustrative embodiment, each of the plurality of notches 436 span the chordal width of the pressure side 444. In other embodiments, one or more of the notches 436 may span less than the chordal width of the pressure side 444.

As shown in FIG. 8, the plurality of notches 436 includes a first notch 456 that has an inner surface 448, an outer surface 450 spaced radially apart from the inner surface 448, and a radially extending support 458 that extends between and interconnects the inner surface 448 and the outer surface 450. The radially extending support 458 defines a first portion 456A of the first notch 456 located near the trailing edge 440 and a second portion 456B of the first notch 456 located near the leading edge 438. The support 458 also provides a portion of the external surface 446 of the pressure side 444. In the illustrative embodiment, the inner surface 448 and the outer surface 450 are planar. In the illustrative embodiment, only one notch 456 of the plurality of notches 436 has a radially extending support 458. In some embodiments, the notch 456 may have more than one radially extending supports 458. In other embodiments, two or more notches 456 of the plurality of notches 436 may have one or more radially extending supports 458.

The airfoils 24 of the present disclosure reduce weight in the low pressure turbine 18 by forming streamwise notches 36, 236, 336, 436 in the pressure side 44 of the airfoils 24 present in the low pressure turbine 18. The streamwise notches 36, 236, 336, 436 may also be formed in airfoils 24 of other vanes or blades present in the gas turbine engine 10. The streamwise notches 36, 236, 336, 436 illustratively extend from the base 30 to the tip 34, however in other embodiments the notches 36, 236, 336, 436 may be formed on only a portion of the span of the pressure side 44 between the base 30 and the tip 34.

The streamwise notches 36, 236, 336, 436 may vary in height, spacing, and shape between designs. Alternatively, each airfoil 24, 224, 324, 424 may have non-uniform notches 36, 236, 336, 436. In the illustrative embodiment, the notches 36, 236, 336, 436 form a rectangular shape in the external surface 46, however in other embodiments the notches 36, 236, 336, 436 may form a triangular shape or other shape when viewed circumferentially.

The notches 36, 236, 336, 436 allow the airfoil 24, 224, 324, 424 to resemble having a thin, solid profile, which allows pressure surface boundary layer separation to occur. The notches 36, 236, 336, 436 are sized to prevent radial migration of a separated pressure surface boundary layer and reduce the impact of two-dimensional separation on the overall airfoil losses. While some radial migration may occur within the notches 36, 236, 336, 436, such separation causes minimal additional loss relative to a standard solid profile of the airfoil 24, 224, 324, 424.

As shown in FIG. 8, radially extending supports 458 (i.e., vertical spars) may be included in one or more notches 436 for mechanical integrity. In the illustrative embodiment, the radially extending support 458 divides the respective notch 436 into two portions or cavities, however in other embodiments additional radial supports 458 may be added within the same notch 436 or other notches. Additionally or alternatively, the corners of the notches 436 may be filleted or rounded to reduce high stress regions.

The notches 36, 236, 336, 436 of the present disclosure may be cast into the base part of the airfoil 24, 224, 324, 424 or machined using an electronic discharge machining (EDM) tool. Vanes and blades present in the low pressure turbine 18 are typically designed to prevent any types of two-dimensional separation on the airfoil 24. Thin, solid airfoils 24 are designed to have a large, closed pressure surface separation.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine wheel assembly adapted for use in a gas turbine engine, the turbine wheel assembly comprising,
a rotor hub configured to rotate about an axis, and
an airfoil coupled with the rotor hub and configured to rotate the rotor hub about the axis in response to gases acting on the airfoil during use of the turbine wheel assembly, the airfoil including a base coupled with the rotor hub and an airfoil body that extends radially outward from the base to a tip of the airfoil body, the airfoil body having a leading edge, a trailing edge spaced apart axially from the leading edge, a suction side that extends between the leading edge and the trailing edge, and a pressure side that extends between the leading edge and the trailing edge opposite the suction side,
wherein the pressure side of the airfoil is formed to define a plurality of notches that extend into an external surface of the airfoil toward the suction side, at least one of the plurality of notches extends chordwise between the leading edge and the trailing edge along a majority of a chord length of the airfoil body, and each of the plurality of notches are spaced apart radially from a neighboring one of the plurality of notches between the base and the tip so that a weight of the airfoil is minimized while isolating radial separation of pressure surface boundary layer separation within each of the plurality of notches to allow airflow along the airfoil,
wherein each of the plurality of notches includes an inner surface and an outer surface spaced radially apart from the inner surface towards the tip of the airfoil, the inner surface and the outer surface are planar, and the radial distance between the inner surface and the outer surface of each of the plurality of notches defines a height for each of the plurality of notches, the plurality of notches includes a first notch having a first height and a second notch spaced radially apart from the first notch and having a second height equal to the first height, wherein a radial distance between the outer surface of the first notch and the inner surface of the second notch is less than the first height.

2. The turbine wheel assembly of claim 1, wherein the plurality of notches includes a first notch having a first height and a second notch spaced radially apart from the first notch and having a second height less than the first height.

3. The turbine wheel assembly of claim 1, wherein each of the plurality of notches is airfoil shaped when viewed radially inward.

4. The turbine wheel assembly of claim 1, wherein at least one notch of the plurality of notches includes a radially extending support that extends between and interconnects the inner surface and the outer surface to define a first portion of the at least one notch located near the leading edge and a second portion of the at least one notch located near the trailing edge, and the support provides a portion of the external surface of the pressure side.

5. The turbine wheel assembly of claim 1, wherein a depth of at least one of the plurality of notches varies along a chord length of the of the airfoil body.

6. The turbine wheel assembly of claim 1, wherein at least one of the plurality of notches is spaced axially apart from the leading edge of the airfoil body, the leading edge disposed at the axially forward most point of the airfoil body.

7. An airfoil adapted for use in a gas turbine engine, the airfoil comprising,
a base, and
an airfoil body that extends radially outward from the base relative to an axis to a tip of the airfoil body, the airfoil body having a leading edge, a trailing edge spaced apart axially from the leading edge, and a first side that extends between the leading edge and the trailing edge,
wherein the first side is formed to define a plurality of notches that extend into an external surface of the airfoil body, at least one of the plurality of notches extends to and opens into the trailing edge of the airfoil body, and each of the plurality of notches are spaced apart radially from a neighboring one of the plurality of notches between the base and the tip so that a weight of the airfoil is minimized while isolating radial separation of pressure surface boundary layer separation within each of the plurality of notches to allow airflow along the airfoil, wherein a depth of at least one of the plurality of notches extends a majority of the way into the airfoil body from the pressure side toward the suction side.

8. The airfoil of claim 7, wherein each of the plurality of notches extend chordwise between the leading edge and the trailing edge of the airfoil body.

9. The airfoil of claim 7, wherein each of the plurality of notches includes an inner surface and an outer surface spaced radially apart from the inner surface towards the tip of the airfoil, and the radial distance between the inner surface and the outer surface defines a height for each of the plurality of notches.

10. The airfoil of claim 9, wherein the inner surface and the outer surface are planar.

11. The airfoil of claim 9, wherein the plurality of notches includes a first notch having a first height and a second notch spaced radially apart from the first notch and having a second height equal to the first height, and a radial distance between the outer surface of the first notch and the inner surface of the second notch is less than the first height.

12. The airfoil of claim 9, wherein the plurality of notches includes a first notch having a first height and a second notch spaced radially apart from the first notch and having a second height equal to the first height, and a radial distance between the outer surface of the first notch and the inner surface of the second notch is equal to the first height.

13. The airfoil of claim 9, wherein the plurality of notches includes a first notch having a first height and a second notch spaced radially apart from the first notch and having a second height less than the first height.

14. The airfoil of claim 7, wherein each of the plurality of notches is airfoil shaped when viewed radially inward.

15. The airfoil of claim 7, wherein the plurality of notches includes a first notch having an inner surface, an outer surface radially spaced apart from the inner surface, and a radially extending support that extends between and interconnects the inner surface and the outer surface to define a first portion of the first notch located near the leading edge and a second portion of the notch located near the trailing edge, and the support provides a portion of the external surface of the first side.

16. A turbine wheel assembly adapted for use in a gas turbine engine, the turbine wheel assembly comprising, a rotor hub configured to rotate about an axis, and an airfoil coupled with the rotor hub and configured to rotate the rotor hub about the axis in response to gases acting on the airfoil during use of the turbine wheel assembly, the airfoil including a base coupled with the rotor hub and an airfoil body that extends radially outward from the base to a tip of the airfoil body, the airfoil body having a leading edge, a trailing edge spaced apart axially from the leading edge, a suction side that extends between the leading edge and the trailing edge, and a pressure side that extends between the leading edge and the trailing edge opposite the suction side, wherein the pressure side of the airfoil is formed to define a plurality of notches that extend into an external surface of the airfoil, a depth of at least one of the plurality of notches extends a majority of the way into the airfoil body from the pressure side toward the suction side, and each of the plurality of notches are spaced apart radially from a neighboring one of the plurality of notches between the base and the tip so that a weight of the airfoil is minimized while isolating radial separation of pressure surface boundary layer separation within each of the plurality of notches to allow airflow along the airfoil.

* * * * *